United States Patent
Bowlin

[11] Patent Number: 5,579,671
[45] Date of Patent: Dec. 3, 1996

[54] AUTOMATIC STEM CUTTING APPARATUS AND METHOD

[76] Inventor: William P. Bowlin, 418 Goldsberry Cir., Shreveport, La. 71106

[21] Appl. No.: 374,240

[22] Filed: Jan. 18, 1995

[51] Int. Cl.⁶ .................................................... B27B 1/00
[52] U.S. Cl. .......................... 83/75.5; 83/425.2; 83/453; 83/508.3
[58] Field of Search ................... 83/75.5, 425.2, 83/363, 471.1, 508.3, 453; 144/379

[56] References Cited

U.S. PATENT DOCUMENTS

| | | | |
|---|---|---|---|
| 4,031,790 | 6/1977 | Arvidsson | 83/425.2 |
| 4,277,999 | 7/1981 | Conner et al. | 83/425.2 |
| 4,294,149 | 10/1981 | Olsson | 83/75.5 |
| 4,468,993 | 9/1984 | McCown et al. | 83/112 |
| 4,640,160 | 2/1987 | Hards | 83/71 |
| 4,907,294 | 3/1990 | Bolton et al. | |
| 5,042,341 | 8/1991 | Greten et al. | 83/75.5 |

*Primary Examiner*—Kenneth E. Peterson
*Attorney, Agent, or Firm*—John M. Harrison

[57] ABSTRACT

An automatic stem cutting apparatus which is designed to analyze and rapidly process full-sized substantially tree-length stems into logs, poles or other segments for further processing in pole mills, sawmills, plywood plants and the like. The stems may be scanned by an optical device and the physical characteristics of the scanned stem are either loaded into a programmable logic controller or sent to a computer connected to the programmable logic controller for determining the optimum value of the segments which can be cut from a stem. The programmable logic controller orchestrates positioning of multiple, linearly-adjustable saw carriages or modules and on-board saw blades to optimize cutting of the stem into the segments. After being scanned, the stems are sequentially transferred to a loading apparatus which positions each stem for subsequent loading onto the saw carriages. After the saws are so positioned, each stem is sequentially transferred by the loading apparatus to the saw carriages, where it is clamped and cut into multiple segments at the preselected optimum points. The cut segments are then ejected onto a conveyor for additional processing. Alternatively, the steps of sequentially off-loading the stems from the stem conveyor onto the loading apparatus, adjusting the saw carriages for selectively cutting the stems, loading the stems onto the saw carriages, clamping the stems in cutting configuration, cutting the stems into segments of selected length and ejecting the segments from the saw carriages for further processing, can be effected by manual operation of the various subassemblies in the automatic stem cutting apparatus.

16 Claims, 10 Drawing Sheets

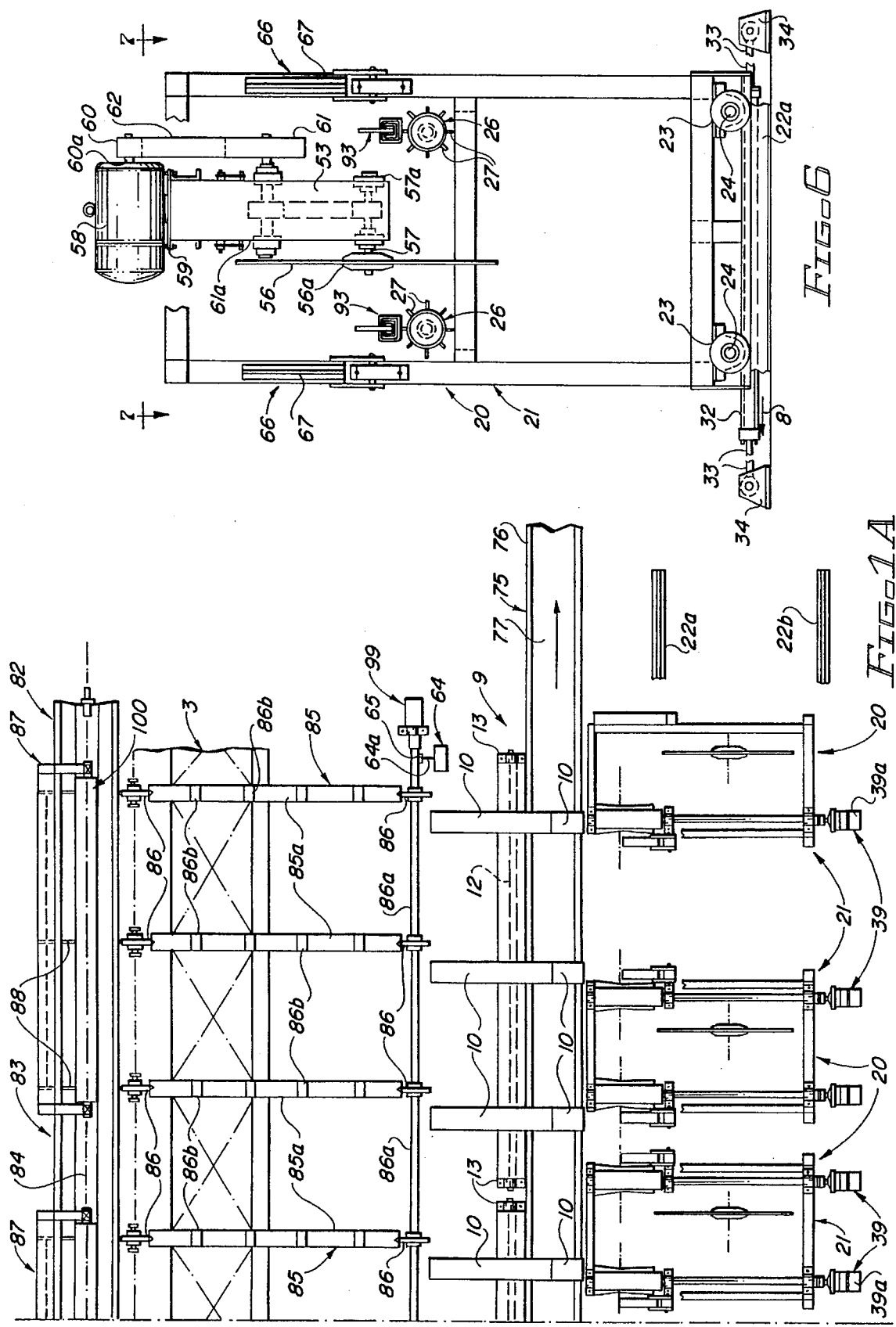

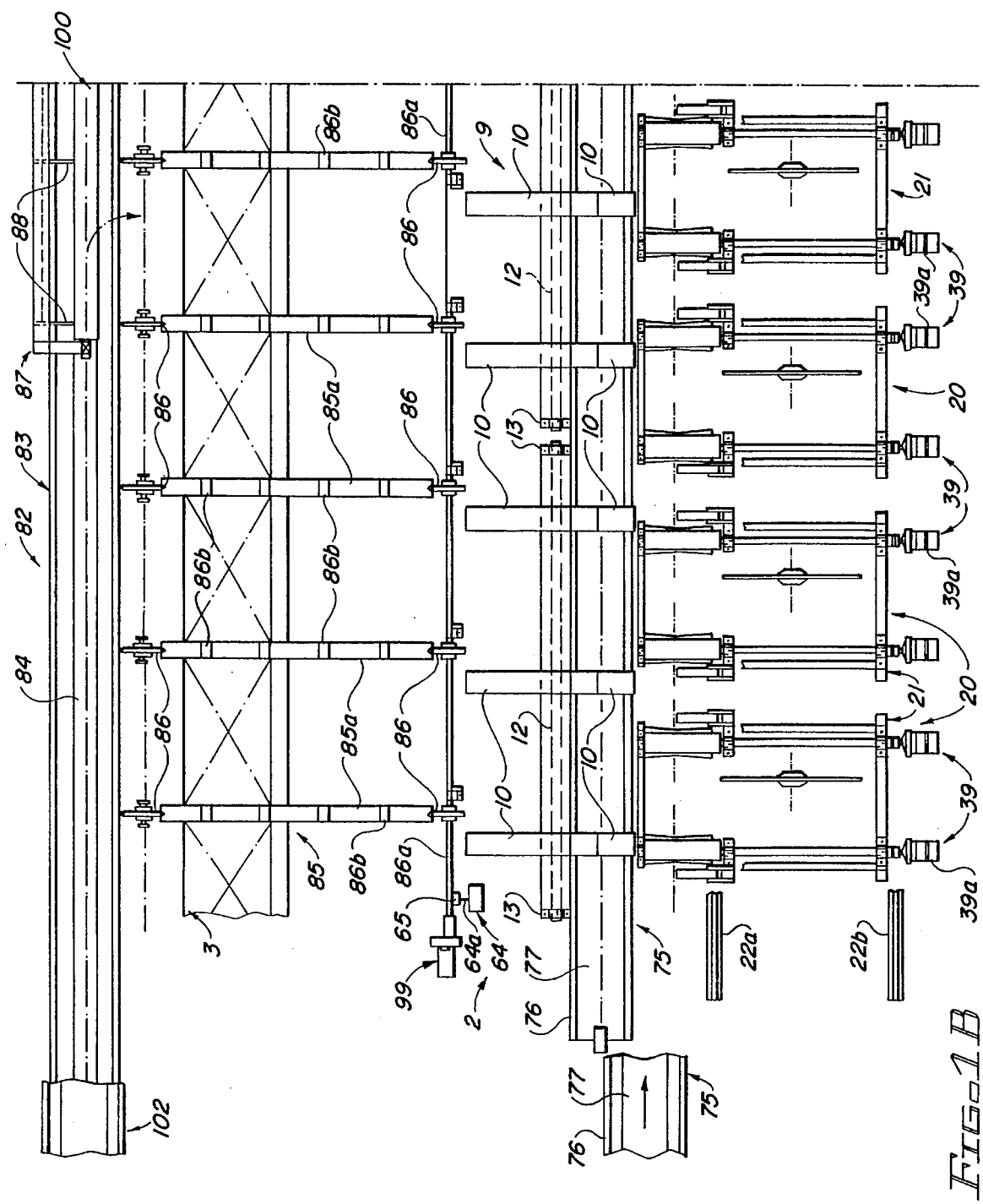

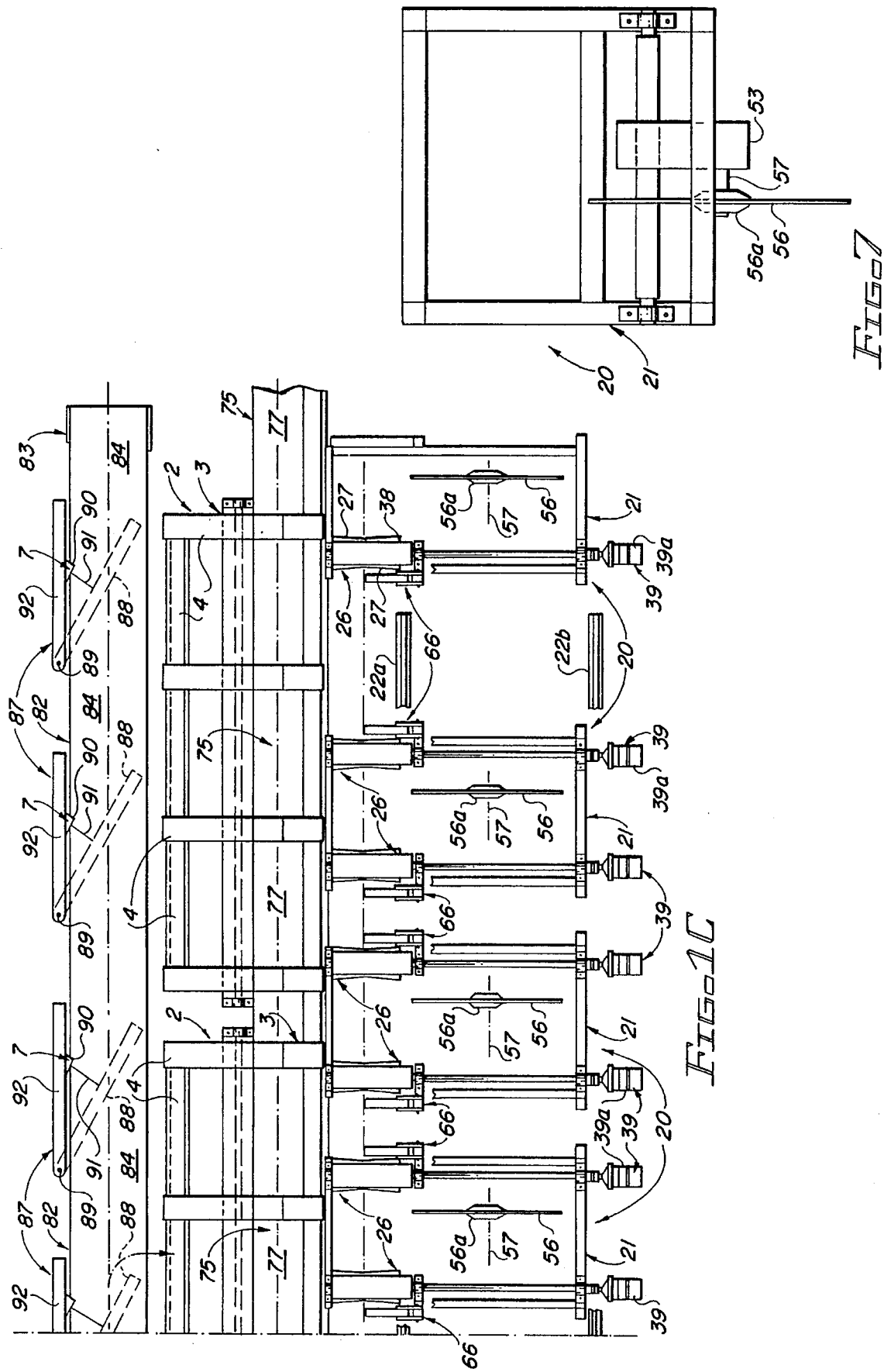

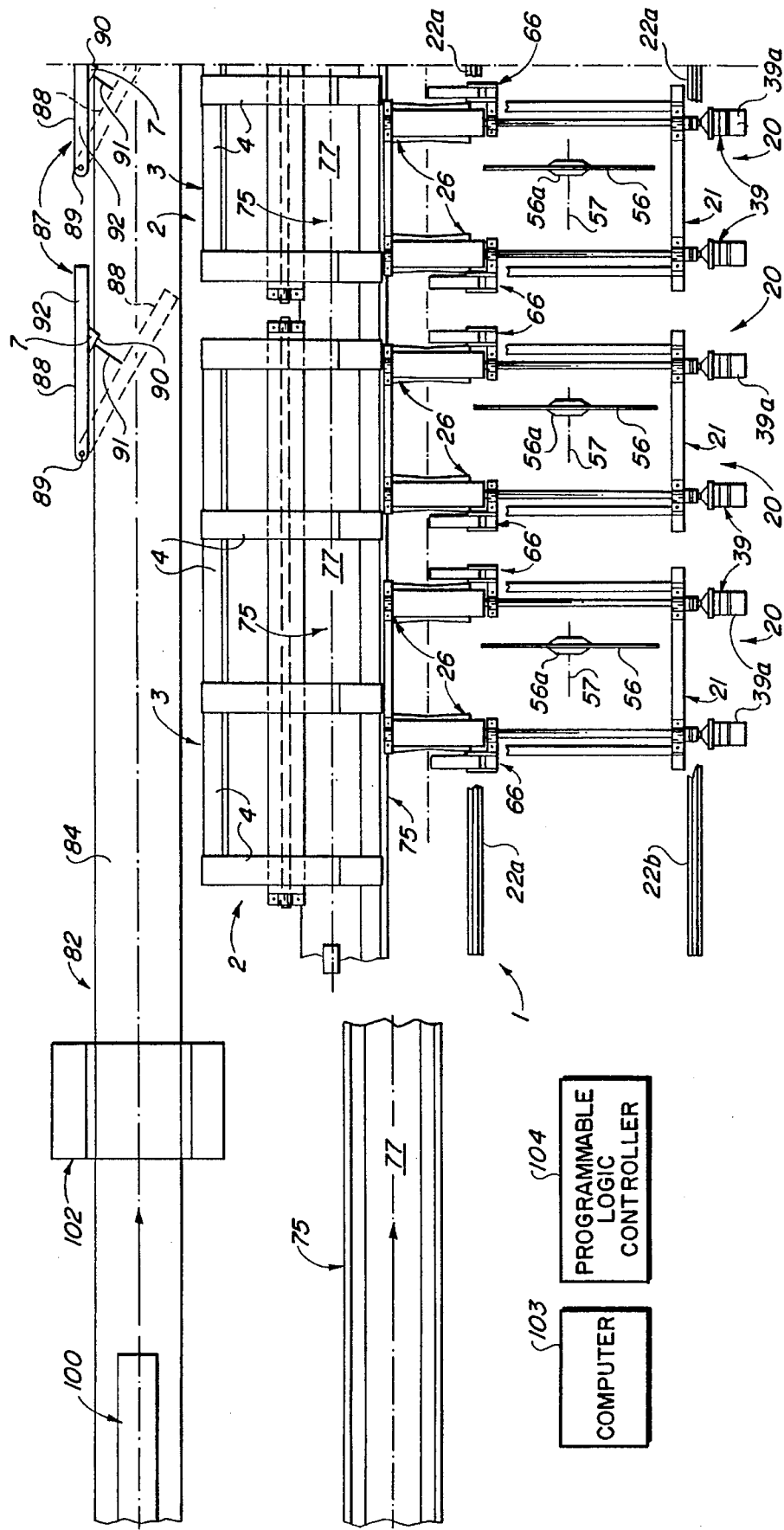

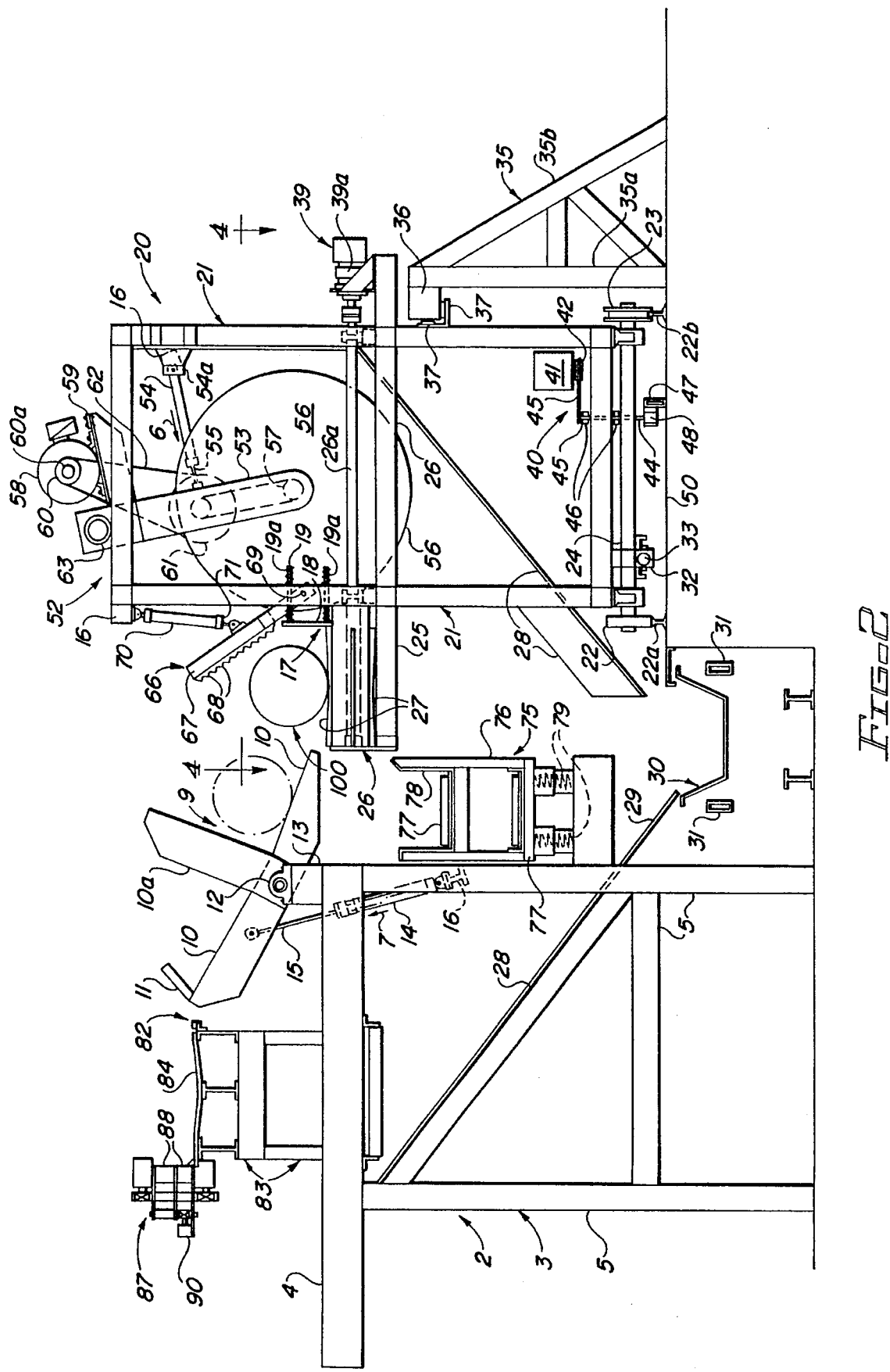

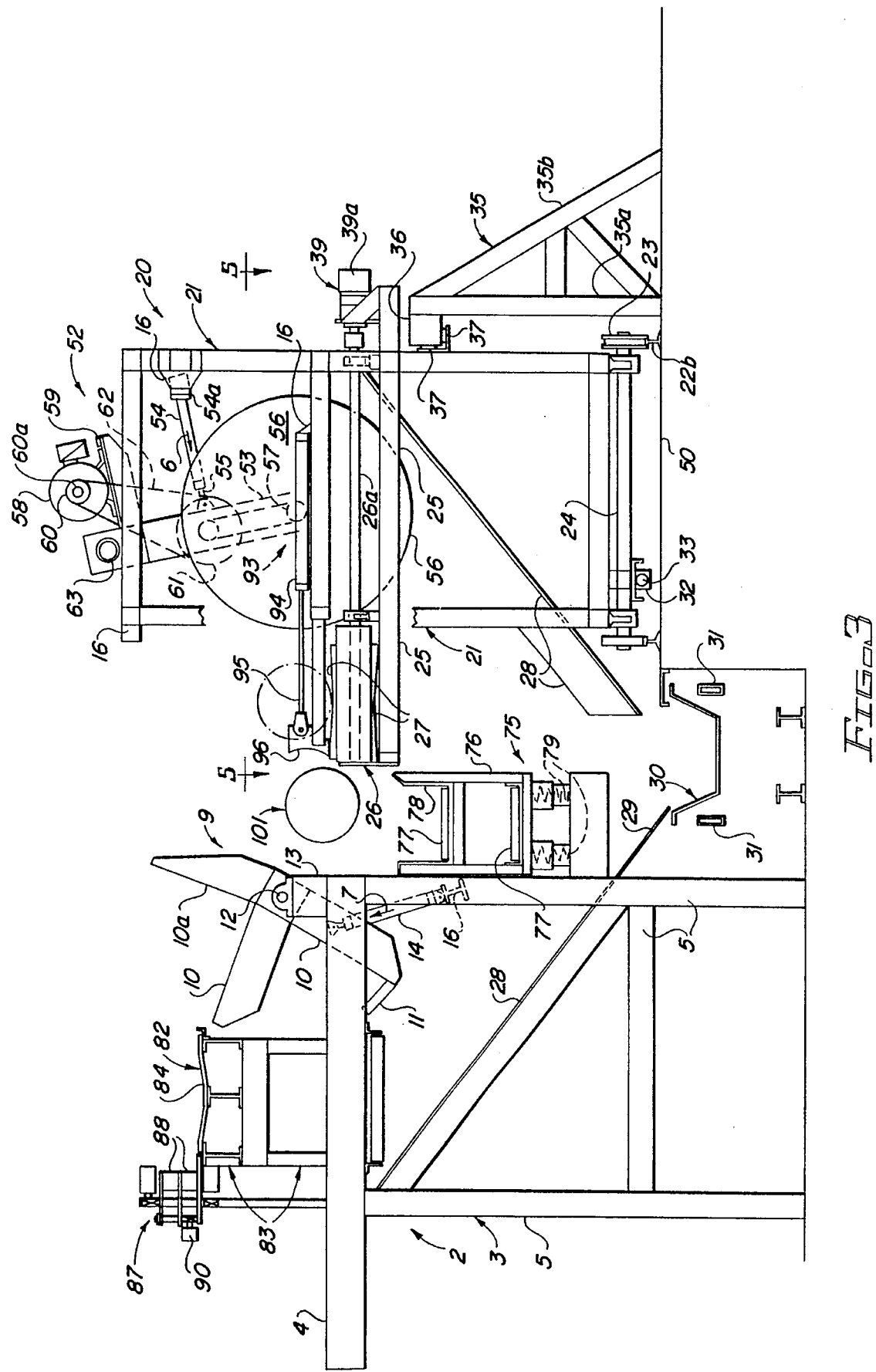

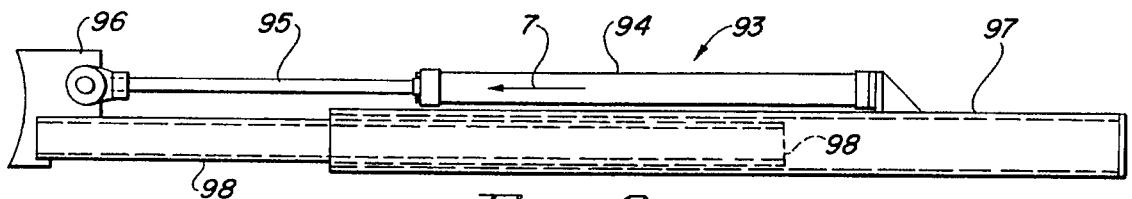
FIG_8
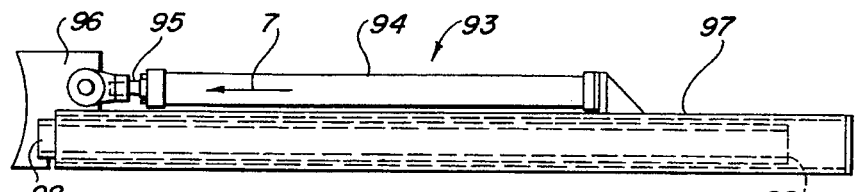
FIG_8A
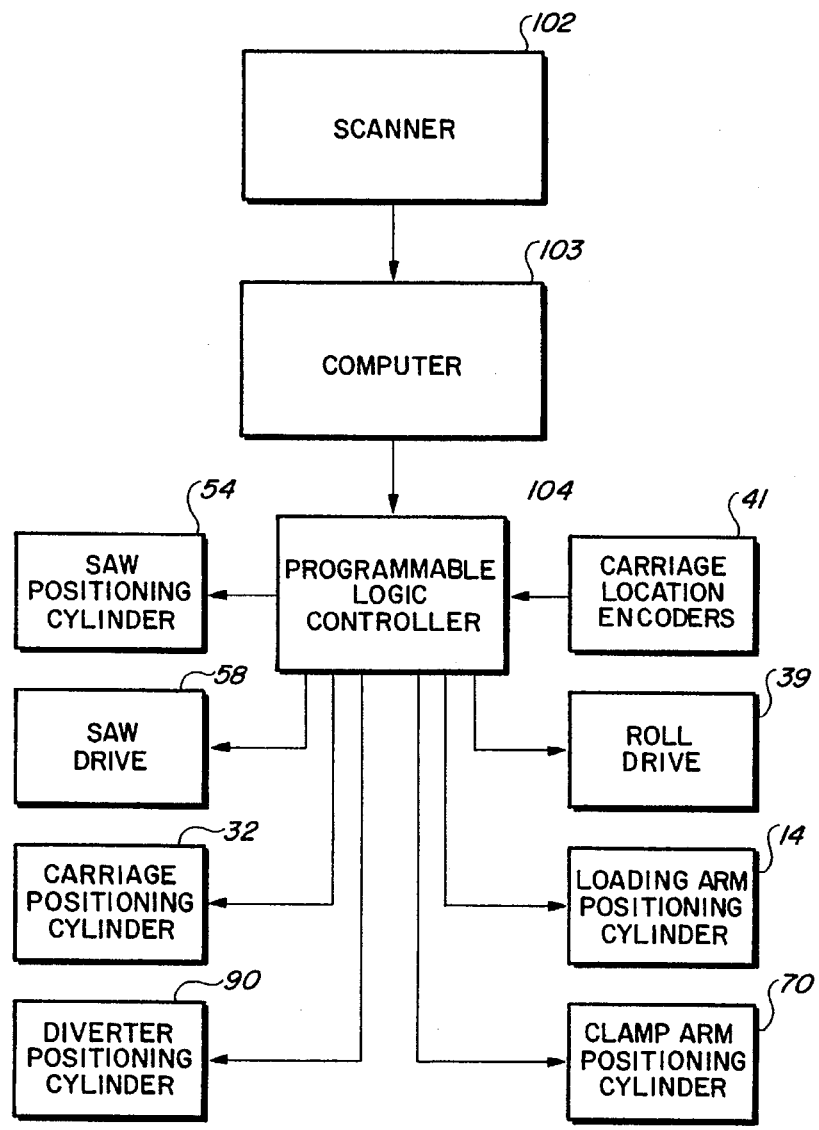
FIG_9

AUTOMATIC STEM CUTTING APPARATUS AND METHOD

BACKGROUND OF THE INVENTION

1. Field of the Invention

This invention relates to a method of cutting, or scanning and cutting full-sized, substantially tree-length "stems" by means of an automatic stem cutting apparatus which is designed to analyze and rapidly process the stems into segments of optimum character. The apparatus is characterized in a preferred automated mode, by a scanner for determining the physical characteristics of incoming stems in sequence, a computer for receiving the scanned information, a programmable logic controller for receiving data from the computer and executing the computer commands to orchestrate operation of the respective apparatus functions, a diverter for diverting the stems from a preselected path, such as a conveyor, a loading apparatus for sequentially receiving the stems and loading the stems one-by-one onto several saw carriages or modules, all but one of which are prepositioned for optimum cutting of each stem by means of carriage positioning cylinders connected to the programmable logic controller, rollers for receiving the stems, clamps located on the saw carriages for stabilizing the stems prior to cutting, circular saws provided in the saw carriages for cutting the stems in concert at the optimum locations determined by the computer and an ejection mechanism in each saw carriage for ejecting the cut segments onto a conveyor for further processing.

One of the problems associated with "bucking" or handling tree-length logs, or "stems" of various size and shape with an infinite pattern of sweep, knots, depressions, twists and other defects and cutting the stems into properly sized logs, poles and other segments for further processing, is that of determining the optimum cuts for each stem in order to provide an optimum stem value from the segments. Various scanning devices and mechanical means for achieving this purpose have been developed in combination with log bucking saws, slasher decks, debarkers and like equipment for achieving the purpose. A primary problem associated with these systems is the complexity of the equipment required and the accompanying slow feed and processing time required to initially determine the optimum cuts in the stem and subsequently effect these cuts to produce segments of optimum length. Added to the problem of slow processing and handling time is that of the considerable down-time required for maintenance purposes, which maintenance down-time is a function of the complexity of the equipment used to process the stems into logs and other segments.

It is therefore an object of this invention to provide an improved, simple and efficient stem evaluation and processing technique and apparatus which is designed to manually, semiautomatically or automatically evaluate the physical characteristics of each incoming stem in sequence and cut the stem into logs, poles and other segments of optimum length for further processing.

Another object of this invention is to provide an automatic stem cutting apparatus which is characterized by an optical scanning device for analyzing the physical characteristics of incoming stems in sequence; a computer receiving the scanned data; a programmable logic controller for controlling the various machine functions; a loading device for receiving each stem and momentarily locating the stem in a holding position; multiple, separately linearly-adjustable saw carriages, each fitted with an encoder and a carriage positioning cylinder electrically connected to the programmable logic controller for adjusting the carriages with respect to the next stem, and further including stem rollers, stem clamping devices and a circular saw for receiving the stem from the loading apparatus, clamping it in place and cutting the stem into segments of optimum length, the carriages also having ejection devices for ejecting the segments from the saw carriages and delivering the segments to a conveyor for transport to further processing.

A still further object of this invention is to provide a new and improved automatic stem cutting apparatus which is computer-controlled and includes an optical scanner for determining the physical characteristics of the incoming stems in sequence; a computer electrically coupled to the scanner; a programmable logic controller electrically connected to the computer and to various positioning cylinders in the apparatus, including a carriage positioning cylinder provided in each one of several linearly-adjustable saw carriages mounted on rails and fitted with encoders electrically coupled to the programmable logic controller, to facilitate automatically positioning the saws adjacent to a loading platform. The loading platform receives the stems one-by-one and is fitted with a loading apparatus for sequentially loading the stems onto the carriage, where the stems are received by rollers, clamped and cut into logs, poles and other segments of optimum length. Ejector mechanisms are provided on each saw carriage for ejecting the cut segments onto a conveyor for transport to further processing.

Yet another object of the invention is to provide a method of "bucking" or cutting stems into segments of optimum length, which method includes the steps of determining the physical characteristics of the stems, positioning multiple saw carriages to receive, clamp and cut the stems, off-loading the stems onto one or more stem loaders, loading the stems from the stem loaders onto the saw carriages, clamping the stems in transverse cutting configuration, cutting the stems into segments of optimum length and ejecting the segments from the saw carriages for transport to further processing.

SUMMARY OF THE INVENTION

These and other objects of the invention are provided in a new and improved manual, semiautomatic or automatic stem cutting apparatus and method for cutting stems into logs, poles and other segments of optimum length for further processing, which apparatus includes, in semiautomatic and automatic mode, a programmable logic controller (semiautomatic operation) or a scanner, computer and programmable logic controller (automatic operation), the latter for determining the physical characteristics of the stems as they arrive on an incoming conveyor. One or more loading apparatus located adjacent to the incoming conveyor receive the stems in sequence as they are diverted from the incoming conveyor responsive to operation of the programmable logic controller. A single fixed saw carriage and multiple, rail-mounted, linearly-adjustable, movable saw carriages, each fitted with a circular saw, are located adjacent to the loading apparatus and the movable saw carriages are provided with encoder or linear positioner-orchestrated carriage positioning cylinders and accessory equipment positioning cylinders, with each encoder or linear positioner and positioning cylinder coupled to the programmable logic controller for automatically positioning the movable saw carriages and saws with respect to the incoming stem and processing the stems into segments of optimum length as they are first loaded from the loading apparatus onto the saw carriages, then clamped into position and finally cut by the saws. An ejector mechanism located in each of the saw carriages ejects the cut segments onto a debarking conveyor for transport to further processing.

BRIEF DESCRIPTION OF THE DRAWINGS

The invention will be better understood by reference to the accompanying drawings, wherein:

FIGS. 1C and 1D are a divided plan view of a preferred embodiment of the automatic stem cutting apparatus of this invention;

FIGS. 1A and 1B are a divided plan view of an alternative preferred embodiment of the automatic stem cutting apparatus;

FIG. 2 is an end elevation of the automatic stem cutting apparatus illustrated in FIGS. 1C and 1D, with a stem loader and saw carriage oriented to receive a stem for cutting by the saws, and the segment ejectors removed for brevity;

FIG. 3 is an end elevation of the automatic stem cutting apparatus illustrated in FIGS. 1C and 1D, with the segments cut from the stem in position for ejection onto a segment conveyor for further processing, and the stem clamps removed for brevity;

FIG. 6 is a front view of the saw carriage illustrated in FIGS. 2 and 3;

FIG. 7 is a sectional view taken along line 7—7 of the saw carriage illustrated in FIG. 6;

FIG. 8 is an enlarged sectional view of the segment log ejector illustrated in FIGS. 3 and 3A in extended configuration;

FIG. 8A is an enlarged sectional view of the segment log ejector illustrated in FIGS. 3 and 3A in retracted configuration; and FIG. 9 is a block diagram of a preferred scanner, computer, programmable logic controller, carriage location encoders, saw drive, roll drive and positioning cylinder combination for automatically operating the automatic stem cutting apparatus.

DESCRIPTION OF THE PREFERRED EMBODIMENTS

Figure 2A:
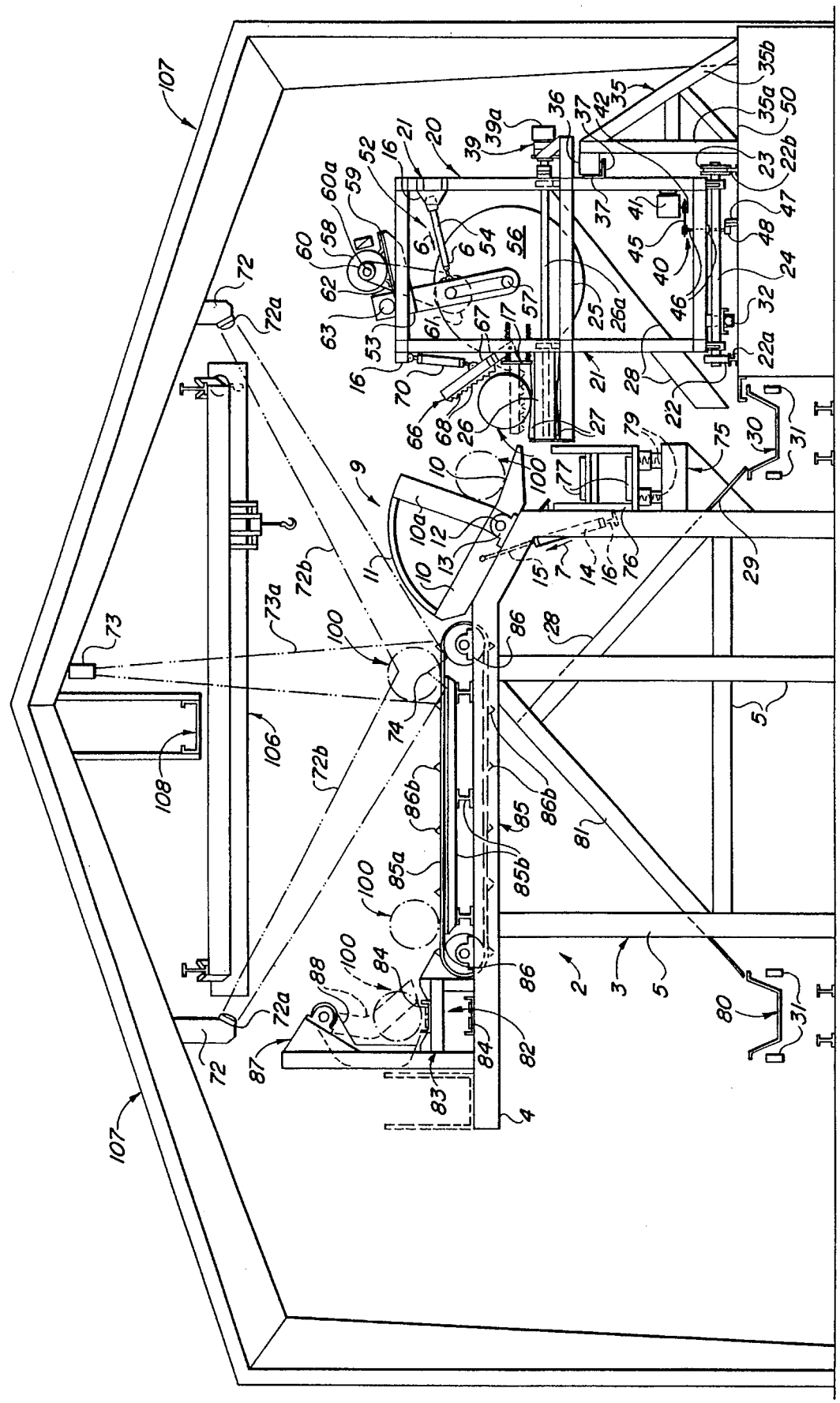
FIG. 2A is an end elevation of the automatic stem cutting apparatus illustrated in FIGS. 1A and 1B.

Referring intially to FIGS. 1–3 of the drawings, in a preferred embodiment the stem cutting apparatus of this invention is illustrated by reference numeral 1. The stem cutting apparatus 1 is typically characterized by three stem loaders 2, each of which is characterized by a loading frame 3, defined by horizontal platform stringers 4 supported by vertical platform supports 5, as illustrated in FIGS. 2 and 3. The stem loaders 2 are located in aligned relationship adjacent to a stem conveyor 82, having a stem conveyor frame 83 which carries a stem conveyor belt 84, fitted with a scanner 102. Accordingly, each of the stems 100 which are transferred by the stem conveyor belt 84 of the stem conveyor 82 to a position adjacent to the stem loaders 2, is scanned along its entire length by the scanner 102. Multiple stem diverters 87 are mounted on the stem conveyor 82 and each of the stem diverters 87 is fitted with a diverter arm 88, pivotally mounted on a diverter frame 92 by means of arm pivot pins 89. In each of the stem diverters 87, a diverter positioning cylinder 90, having a solenoid valve 7, is pivotally attached to the diverter frame 92 and a diverter positioning cylinder piston 91 extends from the diverter positioning cylinder 90 and is pivotally fitted to the diverter arm 88, to faciliate extension of the diverter arm 88 from the diverter frame 92 and sequentially relocating the stem 100 from the stem conveyor 82 to the stem loaders 2.

The stem loaders 2 each further include a loading arm 9, more particularly illustrated in FIGS. 2 and 3, which is pivotally mounted on a shaft cradle 13, attached to the loading frame 3. In each of the loading arms 9, a pair of stem supports 10, separated by a divider arm 10a, pivot on the arm shaft 12 mounted on the shaft cradle 13 to initially position a support flange 11, provided on the end of one of the stem supports 10, adjacent to the stem conveyor 82, as illustrated in FIG. 2. This positioning of the support flange 11 near the loading arm 9 guides each successive stem 100 on the stem conveyor belt 84 of the stem conveyor 82 while the stem 100 is being moved into position adjacent to the respective stem loaders 2. Sequential loading of each stem 100 from the loading frame 3 to the saw carriages 20, illustrated in FIGS. 1–7, is effected by operation of a loading arm positioning cylinder 14, provided on each of the loading arms 9. One end of the loading arm positioning cylinder 14 is pivotally attached to a cylinder mount plate 16, secured to a platform support 5 of the loading frame 3 and the other end is fitted with an extensible loading arm positioning cylinder piston 15, fitted with a solenoid valve 7 and pivotally secured to a stem support 10 of the loading arm 9. This assembly facilitates initially positioning the loading arm 9 into the position illustrated in FIG. 2, with the loading arm positioning cylinder piston 15 extended from the loading arm positioning cylinder 14 and the support flange 11 positioned adjacent to the stem conveyor belt 84. Automatic operation of the stem cutting apparatus 1 is achieved by an interfacing computer 103 and programmable logic controller 104, illustrated in FIGS. 1A, 1D and 8, as hereinafter described.

Figure 3A:
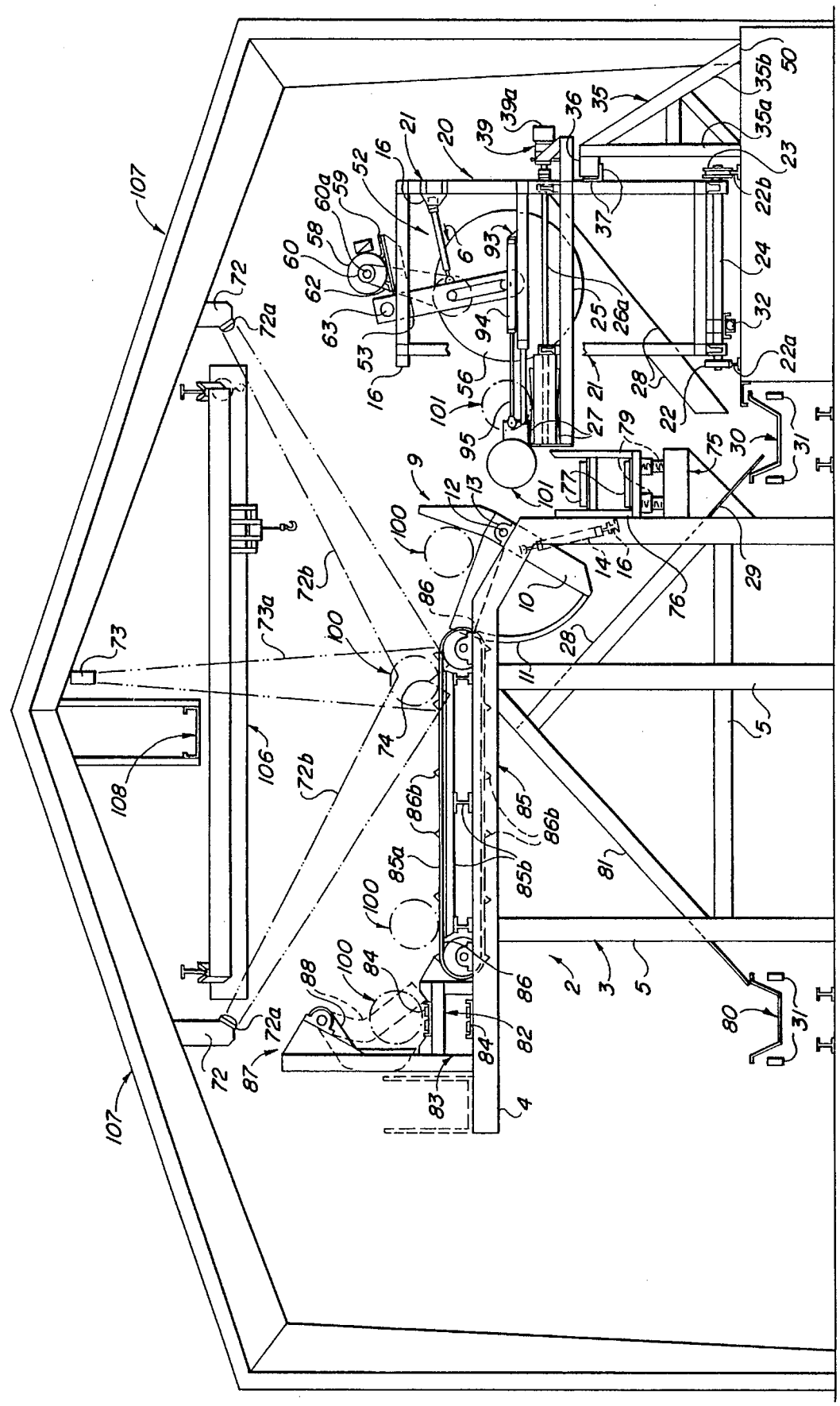
FIG. 3A is an end elevation of the alternative preferred embodiment of the automatic stem cutting apparatus illustrated in FIGS. 1A, 1B and 2A.

The multiple saw carriages 20 are located adjacent to the respective stem loaders 2 in linearly-aligned relationship to receive the stems 100 in sequence from the stem loaders 2, as further hereinafter described. Each of the saw carriages 20 is characterized by a carriage frame 21, and with the exception of the fixed right-hand saw carriage 20 as viewed in FIGS. 1A–1D, are fitted with a pair of flat wheels 22 on one side that roll on a corresponding flat rail 22a, mounted on a supporting surface 50. A pair of V-wheels 23 are located on the opposite side of the carriage frame 21 from the flat wheels 22 and are designed to engage and traverse a V-rail 22b, also mounted on the supporting surface 50, as further illustrated in FIGS. 2 and 3. A wheel shaft 24 connects the flat wheels 22 and the V-wheels 23 to facilitate traversal of each of the carriage frames 21 of the movable saw carriages 20 in both directions, parallel to the stem loaders 2, as further hereinafter described. A horizontal cutting platform 25 is located on each of the carriage frames 21 and receives a pair of cutting rollers 26, each mounted on a rotatable roller shaft 26a, and designed to receive each stem 100 from the stem rollers 2, as further hereinafter described. Each of the roller shafts 26a is provided with a roll drive 39 and a hydraulic valve 39a, linked to the programmable controller 104, for automatically driving the respective cutting rollers 26 and each of the cutting rollers 26 is fitted with multiple, radial, shaped roller plates 27 for seating the stem 100 on the cutting rollers 26, as illustrated in FIG. 2. A spring-loaded shock absorber 17 is mounted in each of the saw carriages 20 and includes a pair of plate rods 19, slidably mounted in the carriage frame 21, biased by a pair of rod springs 19a and connected to a shock absorber plate 18, facing the stem loader 2, for cushioning each stem 100 as it is loaded onto the respective cutting rollers 26. A bumper 38 is mounted on the fixed saw carriage frame 20A located farthest from the scanner 102, for engaging the butt of each stem 100 as the stem 100 is loaded on the saw carriages 20. A sawdust chute 28 is mounted on the carriage frame 21 beneath the cutting platform 25 to receive and channel sawdust from the cut logs, poles and other segments 101 and divert the sawdust to a sawdust conveyor 30. A sawdust deflector plate 29 extends from the loading frame 3 of each of the stem rollers 2 for further diverting the sawdust cut from the segments 101 onto the sawdust conveyor 30. As illustrated in FIGS. 2A and 3A, a trash conveyor 80 is located beneath the platform stringers 4 of the stem loaders 2 at the discharge end of a trash chute 81, which receives bark, chips and trash from the stems 100 and delivers them to the trash conveyor 80 for disposal.

As illustrated in FIGS. 3, 5 and 8 and 8A, a pair of segment ejectors 93 is provided in each one of the saw carriages 20, and each segment ejector 93 includes an ejection cylinder 94, provided with a solenoid valve 7 and attached to the carriage frame 21 of each of the saw carriages 20. Each ejection cylinder 94 receives an ejection cylinder piston 95, designed for extension and retraction inside the ejection cylinder 94. A segment-engaging head 96 is pivotally secured to the extending end of each ejection cylinder piston 95 for engaging each of the segments 101 at the proper time and ejecting the segments 101 in concert from the cutting rollers 26 and cutting platform 25 of each of the carriage frames 21, to a segment conveyor belt 77 mounted on a segment conveyor 75 located below the respective cutting platforms 25. The segment conveyor 75 is mounted on a segment conveyor frame 76, fitted with conveyor springs 79 and segment guide plates 78 for transferring the respective segments 101 for further processing. In a most preferred embodiment of the invention each ejection cylinder piston 95 includes a solenoid valve 7 and is attached to an elongated head tubing 98, slidably fitted within a corresponding length of guide tubing 97 attached to the cutting platform 25, to stabilize the ejection cylinder piston 95 as it ejects the segments 101 onto the segment conveyor 75, as further illustrated in FIGS. 8 and 8A.

Figure 4:
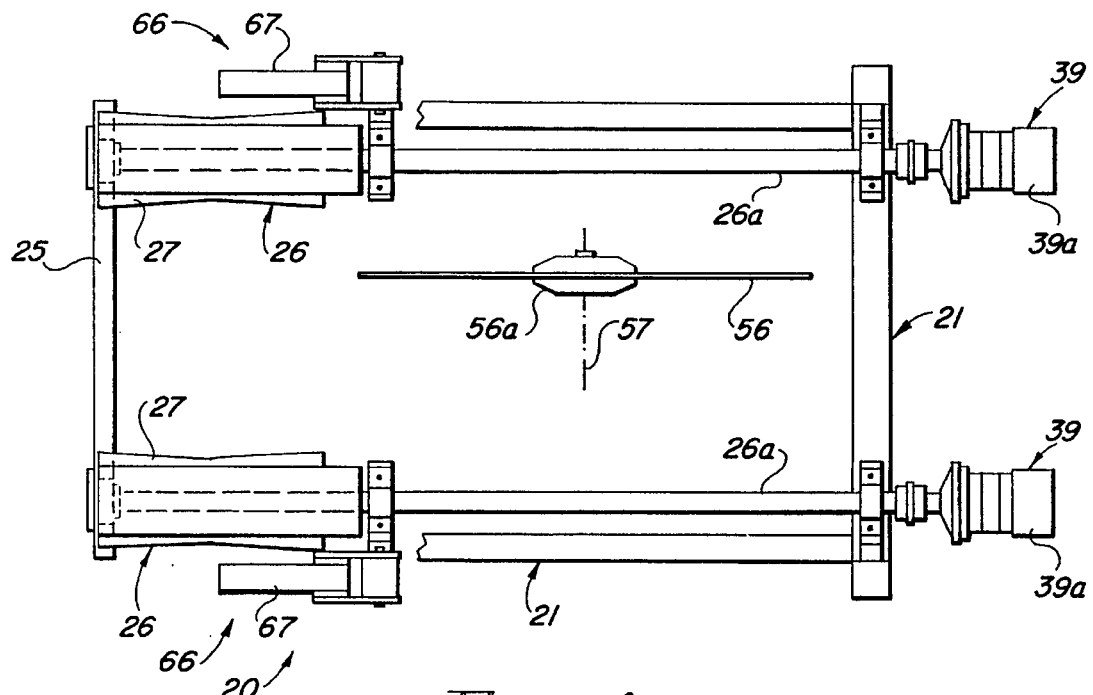
FIG. 4 is a sectional view taken along line 4—4 of the saw carriage illustrated in FIG. 2.
Figure 5:
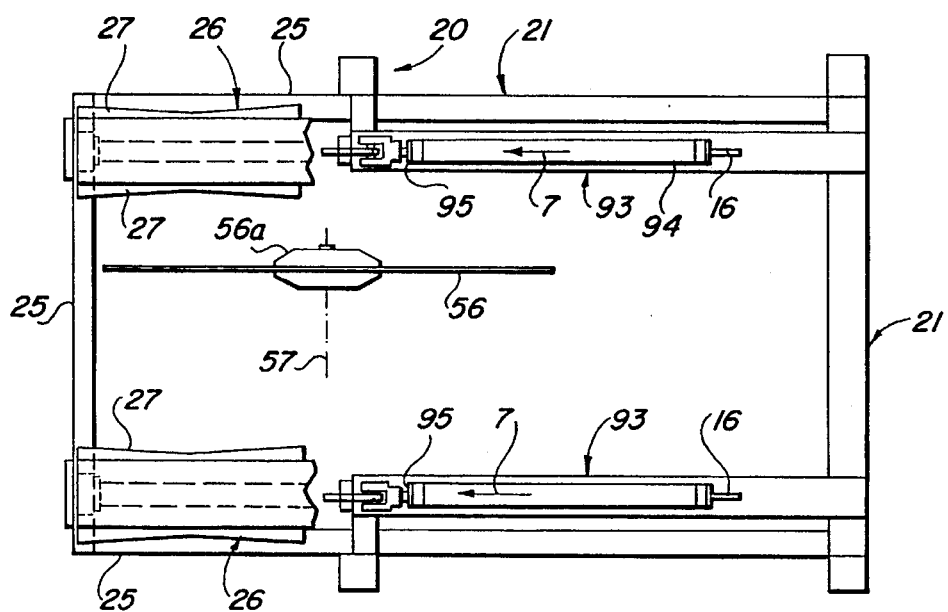
FIG. 5 is a sectional view taken along line 5—5 of the saw carriage illustrated in FIG. 3.

Referring to FIGS. 2 and 4 of the drawings, a pair of stem clamps 66 is provided on the carriage frame 21 of each of the saw carriages 20 above the respective cutting platforms 25 and are each characterized by a clamp arm 67, pivotally secured to a vertical support member of the carriage frame 21 by means of a clamp arm pivot pin 69. Each clamp arm 67 is fitted with arm teeth 68 and is pivotally raised and lowered on the clamp arm pivot pin 69 by means of a clamp arm positioning cylinder 70, having a solenoid valve 7 and pivotally connected to a cylinder mount plate 16, fixed to the carriage frame 21. A clamp arm positioning cylinder piston 71 is extendible and retractable in each clamp arm positioning cylinder 70. Accordingly, the clamp arm positioning cylinders 70 can be operated in concert to extend and retract the corresponding clamp arm positioning cylinder pistons 71, initially raise the clamp arms 67 to the position illustrated in FIG. 2 to receive a stem 100 and then pivot the clamp arms 67 in a downward direction to stabilize the stem 100 in position on the cutting rollers 26 above the cutting platform 25 of each of the carriage frames 21, as illustrated in phantom.

Referring again to FIG. 2 of the drawings, in a most preferred embodiment of the invention an encoder assembly 40 is mounted on the carriage frame 21 above the flat rail 22a and V-rail 22b of each of the movable saw carriages 20 except for the fixed right-hand saw carriage 20 as viewed in FIGS. 1A–1D, and is operably connected to the programmable logic controller 104, as illustrated in FIG. 9. Each encoder assembly 40 includes a carriage location encoder 41 which is fitted with an encoder sprocket 42, connected to a vertical encoder shaft 44 by means of an encoder shaft sprocket 45 and an encoder drive chain 43. The shaft bearings 46 serve to stabilize the encoder shaft 41 in vertical, rotatable relationship, as illustrated in FIG. 2. A horizontal rack fitted with rack teeth (not illustrated) is fixed to the supporting surface 50 between and parallel to the flat rail 22a and the V-rail 22b and extends throughout the length of travel of the respective movable saw carriages 20 on the flat rail 22a and V-rail 22b, respectively. As illustrated in FIG. 6, a carriage positioning cylinder 32, having a servo valve 8 is mounted on the carriage frame 21 and receives a carriage positioning cylinder piston (not illustrated) connected to a carriage positioning cylinder piston rod 33, extending from each end of the carriage positioning cylinder 32 and attached to the supporting surface 50 by means of piston rod mounts 34, for adjusting each movable saw carriage 20 on the flat rail 22a and V-rail 22b. A pinion gear 48 engages the rack 47 and is secured to one end of the encoder shaft 44. Accordingly, operation of the respective carriage positioning cylinders 32 responsive to the commands of the computer 103 and operation of the programmable logic controller 104 and servo valve 8 on the carriage positioning cylinders 32, causes each of the movable saw carriages 20 traverse the flat rail 22a and V-rail 22b responsive to commands from the computer 103, by operation of the programmable logic controller 104, which also receives pulse signals from the carriage location encoders 41, to locate the movable saw carriages 20 in a precise position with respect to the stem 100 for cutting of the stem 100 into segments 101 of optimum length, responsive to information determined from the scanner 102, as hereinafter further described.

Referring again to FIGS. 2, 3, 6 and 7 of the drawings, a blade assembly 52 is provided in each of the saw carriages 20, which blade assembly 52 includes an elongated blade ladder 53, pivotally attached to the carriage frame 21 by means of a ladder pivot shaft 63. Each of the blade ladders 53 further includes a saw positioning cylinder 54, fitted with proportional valve 6 fitted with a linear positioner (not illustrated), one end of which saw positioning cylinder 54 is pivotally secured to a cylinder mount plate 16 on the carriage frame 21 of each of the saw carriages 20, by means of a cylinder pivot pin 54a. The opposite end of the saw positioning cylinder 54 extensibly and retractably receives a saw positioning cylinder piston 55, the extending end of which is pivotally attached to the blade ladder 53, as illustrated. A circular saw blade 56 is rotatably secured to the lower end of the blade ladder 53 by means of a blade arbor 56a on a blade shaft 57, rotatably secured in a blade shaft mount 57a. Each saw blade 56 is driven by operation of a blade pulley 61, mounted in a pulley mount 61a and fitted in driving relationship with a motor pulley 60, attached to the motor shaft 60a of a blade drive motor 58 by means of a drive belt 62. The blade drive motor 58 is coupled to the programmable logic controller 104 for automatic operation, as illustrated in FIG. 9 and is attached to the top end of the blade ladder 53. Accordingly, it will be appreciated that the blade ladder 53 and thus, the blade 56 in each of the saw carriages 20, can be pivoted on each of the ladder pivot shafts 63 in concert by simultaneous operation of each of the saw positioning cylinders 54, to extend the corresponding saw positioning cylinder pistons 55 and position the saw blades 56 in concert from the position illustrated in FIG. 2 to that illustrated in FIG. 3 and simultaneously cut the stem 100 into multiple segments 101 of optimum length, as further hereinafter described.

Referring again to FIGS. 2 and 3 of the drawings, in a most preferred embodiment of the invention a carriage support 35 is provided for each of the movable saw carriages 20 to stabilize the movable saw carriages 20 as they traverse the flat rail 22a and V-rail 22b responsive to commands from the computer 103 and corresponding operation of the programmable logic controller 104 and each of the linear positioners 7 on the corresponding saw positioning cylinders 54 and the carriage location encoders 41. Each carriage support 35 is characterized by a vertical support post 35a, strengthened by a post brace 35b and fitted with a horizontally-oriented rub rail 36, which engages a pair of plate pads (not illustrated) attached to corresponding guide plates 37, welded or bolted to the carriage frame 21 of each of the movable saw carriages 20.

Referring now to FIGS. 1A, 1B, 2A and 3A of the drawings, in an alternative preferred embodiment of the invention the stem loaders 2 include a loading conveyor 85, mounted on the loading frame 3 between the stem conveyor 82 and the loading arms 9. The loading conveyor 85 includes multiple loading conveyor chains 85a, having spaced lugs 86b and mounted on corresponding pairs of loading conveyor sprockets 86, journalled for rotation on loading conveyor beams 85b, which are mounted on the platform stringers 4 of the loading frame 3. The respective loading conveyor sprockets 86 located adjacent to the loading arms 9 are mounted on a common drive rod 86a, driven by a loading conveyor drive motor 99, illustrated in FIGS. 1A and 1B. As illustrated in FIGS. 2A and 3A, stem diverters 87 of alternative design are illustrated, having pivoting diverter arms 88, positioned adjacent to the stem conveyor belt 84 of the stem conveyor 82, for sequentially diverting stems 100 from the stem conveyor 82 onto the loading conveyor 85, as hereinafter described.

As illustrated in FIGS. 2A and 3A, multiple, oppositely-disposed light fixtures 72 are mounted in the structure 107 which houses the stem cutting apparatus 1 and the lights 72a mounted in the light fixtures 72 emit light beams 72b which illuminate the entire length of each stem 100 as the stems 100 are off-loaded from the stem conveyor belt 84 onto the loading conveyor 85 and reach aligned arresting lugs 74, mounted on the respective loading conveyor beams 85b, as hereinafter further described. A series of cameras 73, each having a camera focus 73a, are also mounted on the structure 107 above the loading conveyor 85 and directly above the log positioning arresting lugs 74. Accordingly, the cameras 73 are positioned to photograph the entire length of each stem 100 as the stems 100 are sequentially moved along the loading conveyor 85, to the aligned arresting lugs 74. The photographed information may then be electronically loaded into the computer 103 in the same manner as the electronic data from the scanner 102 is loaded into the computer 103, as hereinafter further described. As further illustrated in FIGS. 2A and 3A of the drawings, a conventional overhead crane 106 and a catwalk 108 are provided in the structure 107 for construction and maintenance of the stem cutting apparatus 1.

Referring again to FIGS. 1A, 1B, 2A and 3A of the drawings, the respective stems 100 are arrested in the parallel loading conveyor chains 85a of the loading conveyors 85 at the arresting lugs 74 by means of a pair of limit switches 64, each having a switch arm 64a, which is engaged by a shaft projection 65a provided on each drive rod 86a that drives the connected set of loading conveyor sprockets 86. Each limit switch 64 is fitted with a timer (not illustrated) and is electrically connected to the corresponding loading conveyor drive motor 99. This system thus stops the respective loading conveyor chains 85a of the loading conveyor 85 when each successive stem 100 arrives at the arresting lugs 74 as the two drive rods 86a complete one revolution and the shaft projections 65 contact the respective switch arms 64a of the two limit switches 64. The two loading conveyor drive motors 99 are simultaneously restarted automatically by operation of the timers in the respective limit switches 64, as hereinafter described.

In operation, the automatic stem cutting apparatus 1 of this invention cuts segments 101 of optimum length from incoming stems 100, as follows. Referring initially to FIGS. 1–9 of the drawings, the stems 100 are delivered in linear sequence to the stem cutting apparatus 1 on the conventional stem conveyor 82, where they are initially scanned by the scanner 102 and the physical characteristics of each of the stems 100 are transferred by the scanner 102 to a computer 103 and from the computer 103 to a programmable logic controller 104. Commands from the programmable logic controller 104 are delivered to the respective servo valves 8 in the carriage positioning cylinders 32, and the carriage location encoders 41 in each encoder assembly 40, located on the respective movable saw carriages 20, cooperate with the servo valves 8 and continually update the programmable logic controller on the relative positions of the movable saw carriages 20 on the flat rail 22a and V-rail 22b. Accordingly, when the physical characteristics of each stem 100 are assimilated by the computer 103 and transferred to the respective servo valves 8 in the carriage positioning cylinders 32 via the programmable logic controller 103, the carriage location encoders 41, servo valves 8 positioners 7 and carriage positioning cylinders 32 operate in concert to precisely position the respective movable saw carriages 20 and thus, the saw blades 56 in each of the movable saw carriages 20, to simultaneously cut the stem 100 into segments 101 of optimum length, as follows: while the movable saw carriages 20 are in the process of adjustment by traversal of the flat rail 22a and the V-rail 22b responsive to operation of the carriage positioning cylinders 32, another stem 100 passes by the scanner 102 and is then diverted in sequence from the stem conveyor belt 84 in the stem conveyor 82 to the loading frame 3 of the fixed stem loaders 2. This diversion is accomplished by operation of the respective stem diverters 87, responsive to extension of the corresponding diverter positioning cylinder pistons 91 in the diverter positioning cylinders 90, by command of the computer 103 and the programmable logic controller 104 and operation of the respective solenoid valves 7 in the diverter positioning cylinders 90. Loading of each stem 100 from the stem loaders 2 to the now-still and prepositioned movable saw carriages 20 occurs as the respective loading arms 9 in each of the stem loaders 2 are pivoted in concert by command of the programmable logic controller 104, on the corresponding arm shafts 12 by operation of the connected solenoid valves 7 on the respective loading arm positioning cylinders 14, to operate the corresponding loading arm positioning cylinder pistons 15. This action lowers the support flange 11, provided on the end of one of the stem supports 10 and used to guide the stems 100 on the stem conveyor 82, and facilitates diversion of each stem 100 in sequence onto the right-hand stem supports 10 of the respective loading arms 9. The loading arms 9 are then pivoted together in the clockwise direction to roll the stem 100 from the right-hand stem supports 10 onto the respective cutting rollers 26 located above the corresponding cutting platforms 25 of each of the saw carriages 20, against the shock absorber plates 18 of the respective shock absorbers 17, with the butt of the stem 100 resting against or near the bumper 38. If the butt of the stem 100 is not resting against the bumper 38, the respective roll drives 39 are automatically operated by the programmable logic controller 104 and hydraulic valves 39a to rotate the corresponding roller shafts 26a and cutting rollers 26, shift the stem 100 laterally and seat the butt of the stem 100 against the bumper 38. The several movable and single fixed saw carriages 20 are now positioned such that the respective saw blades 56 are ready to cut the stem 100 into segments 101 of optimum length. Orchestration of the saw blades 56 to cut the stem 100 is effected by operation of the respective proportional valves 6 and corresponding linear positioners (not illustrated) in the corresponding saw positioning cylinders 54, according to the preprogrammed time sequence which includes operation of the stem diverters 87 and the loading arm 9, by the computer 103 and programmable logic controller 104. When the stem 100 is seated on the cutting rollers 26, the respective solenoid valves 7 on the clamp arm positioning cylinders 70 are activated by operation of the programmable logic controller 104 to extend the clamp arm cylinder positioning piston 71 and lower the clamp arm 67 on the clamp arm pivot pin 69, such that the arm teeth 68 securely engaged the stem 100 and stabilize the stem 100 for cutting, as illustrated in FIG. 2. The respective blade drive motors 58 and saw positioning cylinders 54 are then activated, the latter by operation of the corresponding proportional valves 6 and linear positioners (not illustrated), responsive to command from the programmable logic controller 104, to extend the saw positioning cylinder pistons 55 in concert and cause the blade ladders 53 and the corresponding rotating saw blades 56 to pivot forwardly, as illustrated in FIG. 3, such that each blade 56 engages and cuts the stem 100 in concert with the remaining saw blades 56, at the precise locations previously determined by the respective carriage location encoders 41, as heretofore described. When the stem 100 has been cut into multiple segments 101, the saw positioning cylinders 54 are reversed in concert to retract the saw positioning cylinder pistons 55 and reorient the saw blades 56 together into the "ready" position illustrated in FIG. 2. The ejection cylinders 94 in each of the respective saw carriages 20 are then activated by operation of the corresponding solenoid valves 7 responsive to command from the programmable logic controller 104, to extend the corresponding ejection cylinder pistons 95 and the segment-engaging heads 96 from the position illustrated in FIG. 8A to the configuration shown in FIG. 8, contact the respective segments 101 and force the segments 101 from the cutting platform 25, where they drop onto the segment conveyor belt 77 of the segment conveyor 75, for transport to other areas of the mill for further processing. The respective movable saw carriages 20 are now in configuration for repositioning by the respective carriage positioning cylinders 32 according to signals from the computer 103 and the programmable logic controller 104, to process the next successive stem 100, which was scanned by the scanner 102 while the first stem 100 was being cut into the segments 101. The process is thus repeated, with the entire stem scanning, diversion or off-loading, reloading, clamping, cutting and log-ejecting steps repeated in sequence.

Referring now to FIGS. 1A, 1B and 3A of the drawings, in an alternative preferred embodiment of the invention the loading conveyor 85 is used in the stem cutting apparatus to receive stems 100 from the stem conveyor 82 and deliver them to the loading arms 9. As the stems 100 are sequentially displaced from the loading conveyor 85 by operation of the stem diverters 87 as illustrated in FIG. 3A, the stems 100 rest on the parallel loading conveyor chains 85a of the loading conveyor 85 and move in sequence to the convergence of the camera focus 73a and the light beams 72b, where the loading conveyor belt 85a stops by operation of the limit switches 64, electrically connected to the loading conveyor drive motors 99, illustrated in FIG. 1A. The limit switches 64 stop each stem 100 at the arresting lugs 74 by operation of a switch arm 64a, which contacts a shaft projection 65 on each of the drive rods 86a. This facilitates photographing of the stem 100 by the cameras 73 as the stem 100 rests against the arresting lugs 74 and the loading conveyor chains 85a are still. After the photographs are taken, the limit switches 64 simultaneously restart the loading conveyor drive motors 99 and the aligned lugs 86b closest to the stem 100 simultaneously engages the stem 100 and force it over the arresting lug 74, onto the stem supports 10 of each loading arm 9, as further illustrated in FIG. 3A. The loading arms 9 are then pivoted in concert according to the procedure heretofore described, to load the stem 100 on the cutting rollers 26 in the respective saw carriages 20, as illustrated in FIG. 2A of the drawings. The stem cutting procedure outlined above with regard to the first described embodiment of the invention is then followed to process the stems 100 into segments 101.

Referring again to the drawings, each of the carriage location encoders 41 in the movable saw carriages 20 is designed to signal the programmable logic controller 104 and the corresponding carriage positioning cylinders 32 and facilitate independent location of the respective movable saw carriages 20 throughout travel of the movable saw carriages 20 on the flat rail 22a and the V-rail 22b as the respective pinion gears 48 traverse the corresponding racks 47, to locate the movable saw carriages 20 in predetermined positions determine by the number of teeth traversed in the rack 47 and counted by the carriage location encoders 41. It will be appreciated that the movable saw carriages 20 can be moved in either direction on the flat rail 22a and V-rail 22b, since the carriage encoders 41 and carriage positioning cylinders 22 are reversible to reverse the operation of the pinion gear 48, depending upon the precisely desired location of each of the respective saw blades 56.

It is understood that the respective carriage positioning cylinders 32, diverter positioning cylinders 90, loading arm positioning cylinders 14, clamp arm positioning cylinders 70, ejection cylinders 94, saw positioning cylinders 54, roll drives 39 and blade drive motors 58 may be operated by hydraulic, electric or pneumatic equipment using conventional hoses, couplings, fittings, valves, motors, accessories and the like (not illustrated), according to the knowledge of those skilled in the art.

It will be appreciated by those skilled in the art that the automatic stem cutting apparatus of this invention is characterized by versatility in the number of modules that can be used, as well as the module spacing and range of movement, to customize the system for a specific job. Furthermore, the process considerably speeds the processing and cutting of incoming stems by minimizing the movement of the stems during the cutting process, to optimize cutting of the stems into logs, poles and other segments of optimum length, using a computerized scanning system. It will be further appreciated that substantially any number of fixed stem loaders and rail-mounted movable saw carriages can be used, depending upon the size of the operation envisioned, with each of the movable saw carriages having a carriage location encoder that signals the programmable logic controller electronically connected to the computer. Furthermore, the scanner, (laser camera, electronic or alternative optical scanning device) computer, programmable logic controller and carriage location encoders, as well as the roll drives, blade drive motors, linear positioners, solenoid valves, servo valves and proportional valve, attached to or built into the respective carriage positioning cylinders, diverter positioning cylinders, loading arm positioning cylinders, clamp arm positioning cylinders, ejection cylinders and saw positioning cylinders, may be of any desired design, according to the knowledge of those skilled in the art and operate in conventional fashion to achieve the intended result.

Moreover, referring again to FIGS. 1C and 1D of the drawings, it will be further understood that the saw blade 56 mounted in the saw carriage 20 located farthest from the scanner 102 is known as the "butt-cut saw" and is fixed and designed to precisely remove that portion of the butt end of the stem 100 resting against the fence 34 which is necessary to insure that the remaining segments 101 are of optimum length and size. Accordingly, this fixed saw carriage 20 includes only one cutting roller 26, stem clamp 66 and segment ejector 93. The remaining saw blades 56 serve to cut the stem 100 into the respective segments 101 which are transferred by means of the segment conveyor 75 to the debarking or other progressing area of the mill.

It will also be appreciated by those skilled in the art that the stem cutting apparatus described above can be manually operated by eliminating the functions of the scanner, computer, programmable logic controller and encoders, as desired. Alternatively, any desired function of the apparatus can be performed semiautomatically. For example, the scanner can be used to determine the physical characteristics of the stems and all other functions performed manually.

While the preferred embodiments of the invention have been described above, it will be recognized and understood that various modifications may be made in the invention and the appended claims are intended to cover all such modifications which may fall within the spirit and scope of the invention.

Having described my invention with the particularity set forth above, what is claimed is:

1. A stem cutting apparatus for cutting stems having butt ends into segments, comprising loading means for receiving the stems; a plurality of movable carriages and a fixed carriage disposed adjacent to said loading means for receiving the stems from said loading means; rail means located beneath said movable carriages for receiving said movable carriages in linearly-adjustable relationship; roller means rotatably carried by said movable carriages and said fixed carriage for receiving the stems from said loading means and adjusting the stems with respect to said movable carriages and said fixed carriage; clamp means carried by said movable carriages and said fixed carriage for clamping the stems on said roller means; and saw means provided on said movable carriages and said fixed carriage for cutting the stems into the segments responsive to positioning said movable carriages with respect to the stems.

2. The stem cutting apparatus of claim 1 comprising programmable controller means electrically connected to said loading means, said movable carriages, said roller means, said clamp means and said saw means for linearly adjusting said movable carriages with respect to the stems, loading the stems onto said movable carriages and said fixed carriage, adjusting the stems on said roller means, clamping the stems on said roller means and cutting the stems into segments of substantially optimum length.

3. The stem cutting apparatus of claim 2 comprising scanning means for scanning the stems and assessing the physical characteristics of the stems and computer means electrically connected to said scanning means and said programmable controller means for automatically operating said loading means, said movable carriages, said roller means, said clamp means and said saw means responsive to entry of the physical characteristics of the stems into said computer means from said scanning means.

4. The stem cutting apparatus of claim 1 wherein the stems are directed along a preselected path adjacent to said loading means and comprising diverter means positioned adjacent to the preselected path and said loading means for diverting the stems from the preselected path onto said loading means.

5. The stem cutting apparatus of claim 4 comprising ejector means carried by said movable carriages and said fixed carriage for removing the segments from said movable carriages and said fixed carriage.

6. The stem cutting apparatus of claim 5 comprising programmable controller means electrically connected to said diverter means, said loading means, said movable carriages, said roller means, said clamp means, said saw means and said ejector means for linearly adjusting said movable carriages on said fixed rail means with respect to the stems, diverting the stems from the preselected path onto said loading means, loading the stems from said loading means onto said movable carriages and said fixed carriage, linearly adjusting the stems on said roller means, clamping the stems on said roller means, cutting the stems into segments of substantially optimum length and ejecting the segments from said movable carriages and said fixed carriage.

7. The stem cutting apparatus of claim 6 comprising fluid-operated cylinder means connected to said diverter means, said loading means, said movable carriages, said clamp means, said saw means and said ejector means and control valve means carried by said fluid-operated cylinder means, said control valve means further electrically connected to said programmable controller means for automatically adjusting said movable carriages on said rail means and operating said diverter means, said loading means, said clamp means, said saw means and said ejector means.

8. An automatic stem cutting apparatus for cutting stems individually in linear sequence into segments as the stems travel on a supply conveyor, said automatic stem cutting apparatus comprising diverter means located adjacent to the supply conveyor for sequentially diverting the stems from the supply conveyor; loading means located adjacent to the supply conveyor and said diverter means for sequentially receiving the stems from the supply conveyor responsive to operation of said diverter means; at least two carriage means positioned adjacent to said loading means, with at least one of said carriage means linearly adjustable along a traverse line extending substantially parallel to said loading means, said carriage means sequentially receiving the stems from said loading means; and saw means pivotally carried by said carriage means for cutting said stems on said carriage means, whereby the stems are diverted in sequence from the supply conveyor by said diverter means onto said loading means, said at least one of said carriage means is adjusted along said traverse line with respect to the stems on said loading means and the stems are loaded onto said carriage means and cut into the segments by said saw means.

9. The automatic stem cutting apparatus of claim 8 wherein said loading means comprises a loading frame, a loading conveyor mounted on said loading frame for receiving stems from said supply conveyor and at least two loading arms pivotally carried by said loading frame adjacent to said loading conveyor for receiving the stems from said loading conveyor and loading the stems on said carriage means.

10. The automatic stem cutting apparatus of claim 9 wherein said at least two carriage means comprises a plurality of movable carriages and a fixed carriage disposed substantially parallel to said loading arms, rail means located beneath said movable carriages for receiving said movable carriages in linearly-adjustable relationship and said fixed carriage disposed in fixed relationship; roller means rotatably carried by said movable carriages and said fixed carriage for receiving the stems from said loading arms and adjusting the stems with respect to said movable carriages and said fixed carriage; clamp means carried by said movable carriages and said fixed carriage above said roller means for clamping the stems on said roller means and securing the stems for cutting by said saw means; and ejector means mounted on said movable carriages and said fixed carriage adjacent to said roller means for ejecting the cut segments from said movable carriages and said fixed carriage.

11. The automatic stem cutting apparatus of claim 10 comprising programmable controller means electrically connected to said diverter means, said loading arms, said movable carriages, said roller means clamp means, said saw means and said ejector means, for diverting the stems from the supply conveyor onto said loading conveyor, linearly adjusting said movable carriages and said saw means with respect to the stems, loading the stems from said loading conveyor onto said movable carriages and said fixed carriage, clamping the stems, cutting the stems into segments of substantially optimum length and ejecting the stems from said movable carriages and said fixed carriage and further comprising scanning means positioned above said loading conveyor for scanning the stems and determining the physical characteristics of the stems and a computer electrically connected to said scanning means and said programmable controller means for automatically operating said programmable controller means responsive to entry of the physical characteristics of the stems into said computer.

12. The automatic stem cutting apparatus of claim 8 wherein said loading means comprises a loading frame and at least two loading arms pivotally carried by said loading frame for receiving the stems from said diverter means and loading the stems on said carriage means.

13. The automatic stem cutting apparatus of claim 12 wherein said at least two carriage means comprises a plurality of movable carriages and a fixed carriage disposed substantially parallel to said loading arms, rail means located beneath said movable carriages for receiving said movable carriages in linearly-adjustable relationship, said fixed carriage disposed in fixed relationship; roller means rotatably carried by said movable carriages and said fixed carriage for receiving the stems from said loading arms and adjusting the stems with respect to said movable carriages and said fixed carriage; clamp means carried by said movable carriages and said fixed carriage above said roller means for clamping the stems on said roller means and securing the stems for cutting by said saw means; and ejector means mounted on said movable carriages and said fixed carriage adjacent to said roller means for ejecting the cut segments from said movable carriages and said fixed carriage.

14. The automatic stem cutting device of claim 13 comprising programmable controller means electrically connected to said diverter means, said loading arms, said movable carriages, said roller means, said clamp means, said saw means and said ejector means, for diverting the stems from the supply conveyor onto said loading means, linearly adjusting said movable carriages and said saw means with respect to the stems, loading the stems from said loading arms onto said movable carriages and said fixed carriage, adjusting the stems on said roller means, clamping the stems, cutting the stems into segments of substantially optimum length and ejecting the stems from said movable carriages and said fixed carriage and further comprising a scanner for scanning the stems and assessing the physical characteristics of the stems and a computer electrically connected to said scanner and said programmable controller means for automatically operating said programmable controller means responsive to entry of the physical characteristics of the stems into said computer.

15. The automatic stem cutting apparatus of claim 8 comprising programmable controller means electrically connected to said diverter means, said loading means, said at least one of said carriage means and said saw means for diverting the stems from the supply conveyor onto said loading means, linearly adjusting said at least one of said carriage means and said saw means with respect to the stems, loading the stems from said loading means onto said carriage means and cutting the stems into segments of substantially optimum length.

16. The automatic stem cutting apparatus of claim 15 comprising a scanner for scanning the stems and assessing the physical characteristics of the stems and a computer electrically connected to said scanner and said programmable controller means for automatically operating said diverter means, said loading means, said at least one of said carriage means and said saw means responsive to entry of the physical characteristics of the stems into said computer.

* * * * *